May 21, 1929.  L. BÉCHEREAU  1,713,515

SHOCK ABSORBER

Filed Feb. 3, 1928

Inventor.

Louis Béchereau

Patented May 21, 1929.

1,713,515

UNITED STATES PATENT OFFICE.

LOUIS BÉCHEREAU, OF PARIS, FRANCE.

SHOCK ABSORBER.

Application filed February 3, 1928, Serial No. 251,673, and in Belgium February 10, 1927.

The present invention relates to shock-absorbers and, more particularly, to those of the type formed of telescoping members fitted with a frictional brake mechanism.

One of the objects of the invention is to provide an improved and simplified form of brake mechanism capable of withstanding hard use and adapted to operate with a minimum of lubricating material.

Other objects will appear in the course of the detailed description which will now be given with reference to the accompanying drawings, in which:—

Figure 1:
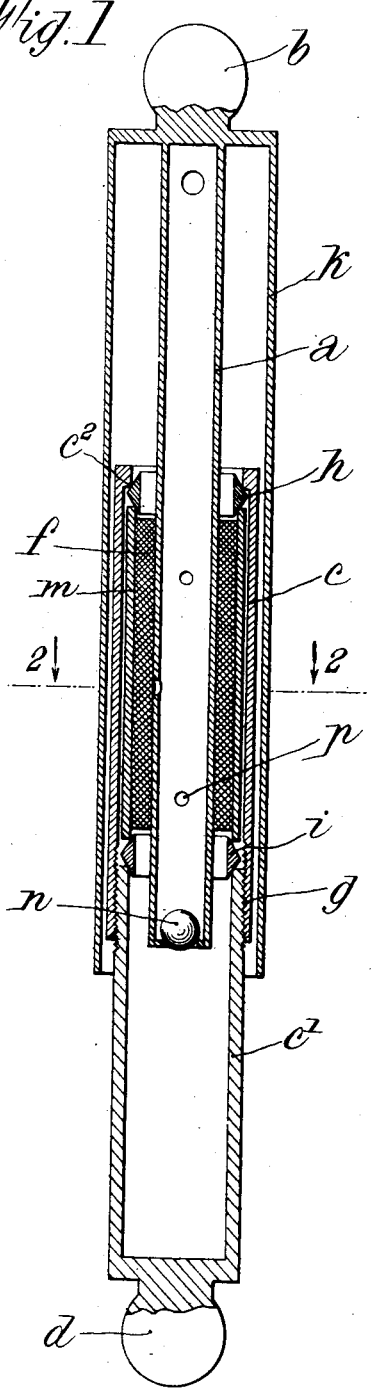
Fig. 1 is an axial longitudinal section through one illustrative embodiment of the invention.
Figure 2:
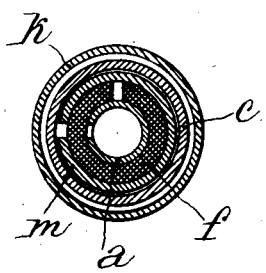
Fig. 2 represents a section taken on line 2—2 of Fig. 1.
Figure 3:
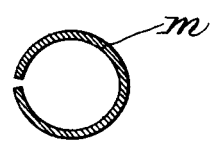
Fig. 3 is a section of the extensible member forming part of the assembly illustrated in Fig. 1.

Referring to the various figures of the drawings, there is shown a tube or piston $a$ open at one end and carrying a ball or similar element $b$ at its other end adapted to articulate with the suspended part of a vehicle,—a tube $c$ open at one extremity and connected at its other extremity to a tube $c'$ adapted to act as lubricant reservoir,—a ball or similarly shaped element $d$ having a similar function to ball $b$ and designed to be attached to the non-suspended part of a vehicle,—a cylindrical extensible segment $f$, having a C-shaped section and formed of canvas or similar porous textile material capable of absorbing and retaining lubricant,—an elastic cylindrical element $m$ formed of spring steel or like resilient material and having a C-section flattened in the direction of one of its diameters, this element serving to insure intimate contact between segment $f$ and tube $a$,—means for adjusting the pressure exerted by segment $f$ on tube $a$ comprising a pair of ring shaped conic wedges $h$ and $i$ bearing against annular shoulder $c^2$ and the inner edge of the upper extremity of $c^1$ respectively and exerting a spreading action on elastic element $m$ which may be varied by rotating tube $c$ on thread $g$ of tube $c^1$,—a protecting tube $k$ extending over the various operating elements,—and a lubricating system comprising a ball valve $n$ and a series of holes $p$ permitting lubricant to reach and permeate segment $f$.

The manner in which the device operates is practically self-evident from the foregoing description. To vary the gripping action of segment $f$ it is only necessary to screw or unscrew tube $c$, thus shortening or lengthening the distance between wedges $h$ and $i$ and increasing or decreasing the radial pressure exerted by elastic sheath $m$. Preferably, the long diameter of sheath $m$ is made approximately equal to the external diameter of $f$ and the short diameter somewhat less than the latter so that the sheath, when mounted in place, is of circular section.

The inventor is aware of the existence of similar shock-absorbers employing springs and other complicated and non-regulable devices for adjusting the action of the gripping or braking elements. The limitations and defects of such devices are largely done away with by substituting the simple wedge and adjustable tube structures herein above described.

What I claim is:—

1. A device of the class described comprising in combination a piston element, a flexible frictional element mounted in contact with said piston element, a resilient sheath mounted in contact with said flexible frictional element and adapted to maintain said frictional element in contact with the piston element, a pair of wedges adapted to engage on the inner side of the extremities of the resilient tube and to exert a spreading action thereon, and means for varying the distance between said wedges, whereby the spreading effect of said wedges on the resilient element and the corresponding pressure exerted by the latter on the frictional element may be varied.

2. A device of the class described comprising in combination a piston element, a flexible frictional element mounted in contact with said piston element, a resilient sheath mounted in contact with said flexible frictional element and adapted to maintain said frictional element in contact with the piston element, an extensible tube extending over the several hereinbefore mentioned elements, and means operable by a change of length of said extensible tube to vary the pressure exerted by said resilient sheath on said flexible frictional element.

3. A device of the class described comprising in combination a piston element, a flexible frictional element mounted in contact with said piston element, a resilient sheath mounted in contact with said flexible frictional element and adapted to maintain said frictional element in contact with the piston element, an extensible tube extending over the various hereinabove mentioned elements, said extensible tube having abutments associated therewith positioned adjacent the ends of the resilient sheath, and a pair of wedges positioned so that each engages with one of said abutments and a corresponding extremity of the resilient sheath, whereby the lengthening of the extensible tube will result in retraction of the wedges and increase the pressure exerted by the resilient sheath on the frictional element and the shortening of the extensible tube will bring about a contrary result.

4. A device of the class described comprising in combination a cylindrical piston element, a flexible frictional element mounted in contact with said piston element, a resilient sheath mounted in contact with said flexible frictional element and adapted to maintain said frictional element in contact with the piston element, said resilient sheath having an oval section when detached, an extensible tube extending over said resilient sheath, said extensible tube having abutments associated therewith positioned adjacent the ends of the resilient sheath, and a pair of annular wedges interposed between said abutments and the inner edges of the extremities of the resilient sheath, whereby variation of the length of the extensible tube will vary the spreading effect exerted by the wedges on the resilient sheath and correspondingly vary the pressure exerted by the latter on the flexible frictional element.

5. A device as defined in claim 1 in combination with means for lubricating the flexible frictional element.

In testimony whereof I have hereunto set my hand.

LOUIS BÉCHEREAU.